(12) United States Patent
Shemesh et al.

(10) Patent No.: US 10,830,863 B1
(45) Date of Patent: Nov. 10, 2020

(54) METHODS FOR DYNAMIC COMPUTER NETWORK FINGERPRINT MATCHING AND DEVICES THEREOF

(71) Applicant: F5 Networks, Inc., Seattle, WA (US)

(72) Inventors: Yaniv Shemesh, Redmond, WA (US); David Stav, Seattle, WA (US); Ziv Rika, Tel Aviv (IL)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 16/282,683

(22) Filed: Feb. 22, 2019

Related U.S. Application Data

(60) Provisional application No. 62/633,967, filed on Feb. 22, 2018.

(51) Int. Cl.
| | | |
|---|---|---|
| *H04W 4/33* | (2018.01) | |
| *H04W 4/029* | (2018.01) | |
| *G01S 5/02* | (2010.01) | |
| *H04W 64/00* | (2009.01) | |
| *H04L 29/06* | (2006.01) | |
| *H04W 4/021* | (2018.01) | |

(52) U.S. Cl.
CPC .......... *G01S 5/0252* (2013.01); *G01S 5/0278* (2013.01); *H04L 63/08* (2013.01); *H04L 63/102* (2013.01); *H04W 4/021* (2013.01); *H04W 4/029* (2018.02); *H04W 64/003* (2013.01)

(58) Field of Classification Search
CPC ................................ H04W 4/029; H04W 4/33
USPC ....................................................... 455/456.1
See application file for complete search history.

(56) References Cited

U.S. PATENT DOCUMENTS

| | | | |
|---|---|---|---|
| 7,515,576 B2 | 4/2009 | Montenegro | |
| 7,562,304 B2 * | 7/2009 | Dixon | .................... G06Q 30/02 |
| | | | 715/738 |
| 7,841,002 B2 | 11/2010 | Golobrodsky et al. | |
| 8,151,327 B2 | 4/2012 | Eisen | |
| 8,321,791 B2 * | 11/2012 | Dixon | ................ H04L 63/1441 |
| | | | 715/738 |

(Continued)

OTHER PUBLICATIONS

BIG-IP® Application Security Manager®: Implementations, Version 13.0, F5 Networks, Inc. (2017).

(Continued)

*Primary Examiner* — William D Cumming
(74) *Attorney, Agent, or Firm* — Troutman Pepper Hamilton Sanders LLP (Rochester)

(57) ABSTRACT

Methods, non-transitory computer readable media, network traffic management apparatuses, and network traffic management systems that receives a client access request to access content at one or more server devices. Fingerprint attributes associated with the client device are collected and utilized to identify potential fingerprints. Potential fingerprints are identified based on the collected fingerprint attributes. Previously validated fingerprints stored in a database are utilized to determine when the one of the potential fingerprints matches with one of a previously validated fingerprints stored in the database. The client device is authorized to access content requested in the client access request when the determination indicates that the one of the potential fingerprints matches with one of the plurality of previously validated fingerprints stored in the database.

20 Claims, 5 Drawing Sheets

(56) References Cited

U.S. PATENT DOCUMENTS

| | | | |
|---|---|---|---|
| 8,397,080 B2* | 3/2013 | Lu | G06F 11/1453 713/189 |
| 8,516,377 B2* | 8/2013 | Dixon | H04L 67/02 715/738 |
| 8,682,916 B2* | 3/2014 | Wong | G06F 16/1865 707/758 |
| 8,713,704 B2 | 4/2014 | Davis et al. | |
| 8,844,041 B1 | 9/2014 | Kienzle et al. | |
| 10,021,529 B2* | 7/2018 | Narasimhan | H04W 4/029 |
| 10,320,784 B1* | 6/2019 | Talmor | H04L 63/0876 |
| 10,349,242 B2* | 7/2019 | Narasimhan | H04W 4/33 |
| 10,678,831 B2* | 6/2020 | Lin | G06F 16/3344 |
| 2006/0253581 A1* | 11/2006 | Dixon | G06Q 30/02 709/225 |
| 2010/0042931 A1* | 2/2010 | Dixon | H04L 63/1441 715/738 |
| 2012/0030477 A1* | 2/2012 | Lu | G06F 11/1453 713/189 |
| 2013/0014020 A1* | 1/2013 | Dixon | H04L 63/1483 715/738 |
| 2014/0283061 A1 | 9/2014 | Quinlan et al. | |
| 2014/0331119 A1* | 11/2014 | Dixon | G06Q 30/02 715/234 |
| 2015/0101050 A1 | 4/2015 | Nielson et al. | |
| 2016/0316342 A1* | 10/2016 | Narasimhan | H04W 4/029 |
| 2018/0181734 A1* | 6/2018 | Vilenskii | A61B 5/0531 |
| 2018/0295151 A1* | 10/2018 | Amdahl | H04L 63/1441 |
| 2019/0065588 A1* | 2/2019 | Lin | G06F 16/3344 |

OTHER PUBLICATIONS

TMOS: Operations Guide, F5 Networks, Inc., pp. 1-278, Original Date Mar. 5, 2015, Updated Date Oct. 3, 2017.

"Big-IP® Application Security Manager™: Getting Started," Version 11.4, pp. 1-70, Publication No. MAN-0285-07, F5 Networks, Inc., May 15, 2013.

"Big-IP®Analytics: Implementations," Version 11.4, Publication No. MAN-0357-04, F5 Networks, Inc., pp. 1-46, May 15, 2013.

"Big-IP® Application Security Manager™: Implementations," Verision 11.4, Publication No. MAN-0358-04, F5 Networks, Inc., pp. 1-200, May 15, 2013.

"Big-IP® Systems: DOS Protections and Protocol Firewall Implementations," Version 11.4, Publication No. MAN-0440-01, F5 Networks, Inc., pp. 1-64, May 15, 2013.

"Big-IP®TMOS®: Concepts," Version 11.4, Publication No. MAN-0378-04, F5 Networks, Inc., pp. 1-140, May 15, 2013.

"Configuration Guide for Big-IP® Application Security Managerlm," Version 11.4, Publication No. MAN-0283-07, F5 Networks, Inc., pp. 1-373, May 15, 2013.

"Big-IP ASM," Release Notes, Verision 11.4.1, F5 Networks, Inc., pp. 1-51, Apr. 12, 2016.

"Big-IP® TMOS®: Implementations," Version 11.4, Publication No. MAN-0379-05, F5 Networks, Inc., pp. 1-234, May 5, 2015.

"Big-IP ASM," Release Notes, Version 11.4.1, F5 Networks, Inc., pp. 1-69, Jul. 31, 2015.

* cited by examiner

Table 1: Illustration of fingerprint database table

| Device ID | Fingerprint Update History | Fingerprint Attribute 1 | Fingerprint Attribute 2 | Fingerprint Attribute 3 |
|---|---|---|---|---|
| Fingerprint 1 | <Date> <br> <Date> <br> <Date> | <Value 1.A> <br> Update History: <br> <Date> \| <Date> | <Value 2.A> <br> Update History: <br> <Date> \| <Date> | <Value 3.A> <br> Update History: <br> <Date> \| <Date> |
| Fingerprint 2 | <Date> <br> <Date> <br> <Date> | <Value 1.A> <br> Update History: <br> <Date> \| <Date> | <Value 2.B> <br> Update History: <br> <Date> \| <Date> | <Value 3.B> <br> Update History: <br> <Date> \| <Date> |
| Fingerprint 3 | <Date> <br> <Date> <br> <Date> | <Value 1.B> <br> Update History: <br> <Date> \| <Date> | <Value 2.C> <br> Update History: <br> <Date> \| <Date> | <Value 3.C> <br> Update History: <br> <Date> \| <Date> |

FIG.5

METHODS FOR DYNAMIC COMPUTER NETWORK FINGERPRINT MATCHING AND DEVICES THEREOF

This application claims the benefit of U.S. Provisional Patent Application Ser. No. 62/633,967, filed Feb. 22, 2018, which is hereby incorporated by reference in its entirety.

FIELD

This technology relates to methods and systems for dynamic computer network fingerprint matching to authenticate and track identity of client devices.

BACKGROUND

Often a client device accessing applications at a server device first needs to be authenticated in order to access applications. The authentication of a client device may be performed by validating the internet protocol (IP) address associated with the client device. Unfortunately, authenticating a client device based on the IP addresses has drawbacks, such as spoofing of the IP address by way of example, which poses security risks.

As a result, fingerprinting techniques have been developed that overcome many of the drawbacks associated with authenticating client devices based on IP addresses. Unfortunately, although fingerprinting techniques have been more effective, their use has presented new challenges. In particular, when large numbers of client devices need to be authenticated, then the number of fingerprints associated with these client devices grows. As the number of these stored fingerprints grows, navigating through these stored fingerprints in order to identify one becomes more challenging and may not result in identifying the correct fingerprint. Additionally, attributes of these client devices used by the fingerprinting techniques may change posing further authentication challenges and potentially presenting additional security risks.

SUMMARY

A method for dynamic fingerprint matching, implemented in cooperation with a network traffic management system comprising one or more network traffic management modules, server modules, or client modules, includes receiving a client access request to access content at one or more server devices. Fingerprint attributes associated with the client device are collected and utilized to identify potential fingerprints. Potential fingerprints are identified based on the collected fingerprint attributes. Previously validated fingerprints stored in a database are utilized to determine when the one of the potential fingerprints matches with one of a previously validated fingerprints stored in the database. The client device is authorized to access content requested in the client access request when the determination indicates that the one of the potential fingerprints matches with one of the plurality of previously validated fingerprints stored in the database.

A network traffic management apparatus including memory including programmed instructions stored thereon and one or more processors configured to be capable of executing the stored programmed instructions to receive a client access request to access content at one or more server devices. Fingerprint attributes associated with the client device are collected and utilized to identify potential fingerprints. Potential fingerprints are identified based on the collected fingerprint attributes. Previously validated fingerprints stored in a database are utilized to determine when the one of the potential fingerprints matches with one of a previously validated fingerprints stored in the database. The client device is authorized to access content requested in the client access request when the determination indicates that the one of the potential fingerprints matches with one of the plurality of previously validated fingerprints stored in the database.

A non-transitory computer readable medium having stored thereon instructions for including executable code that, when executed by one or more processors, causes the processors to receive a client access request to access content at one or more server devices. Fingerprint attributes associated with the client device are collected and utilized to identify potential fingerprints. Potential fingerprints are identified based on the collected fingerprint attributes. Previously validated fingerprints stored in a database are utilized to determine when the one of the potential fingerprints matches with one of a previously validated fingerprints stored in the database. The client device is authorized to access content requested in the client access request when the determination indicates that the one of the potential fingerprints matches with one of the plurality of previously validated fingerprints stored in the database.

A network traffic management system includes one or more traffic management modules, server modules, or client modules, memory comprising programmed instructions stored thereon, and one or more processors configured to be capable of executing the stored programmed instructions to receive a client access request to access content at one or more server devices. Fingerprint attributes associated with the client device are collected and utilized to identify potential fingerprints. Potential fingerprints are identified based on the collected fingerprint attributes. Previously validated fingerprints stored in a database are utilized to determine when the one of the potential fingerprints matches with one of a previously validated fingerprints stored in the database. The client device is authorized to access content requested in the client access request when the determination indicates that the one of the potential fingerprints matches with one of the plurality of previously validated fingerprints stored in the database.

This technology provides a number of advantages including providing methods, non-transitory computer readable media, network traffic management apparatuses, and network traffic management systems that dynamically match fingerprints to more effectively and efficiently authenticate and track an identities of client devices. This technology provides an automated system of identifying invalid fingerprints and only authorizing access to valid fingerprints, thus detecting bots and malicious attacks over a network. Additionally, this technology advantageously provides dynamic learning and scoring of valid fingerprints over a period of time to further filter fingerprints that are similar to each other and difficult to differentiate.

BRIEF DESCRIPTION OF THE DRAWINGS

FIG. 5 is shows a Table 1 that illustrates a fingerprint database table.

DETAILED DESCRIPTION

Figure 1:
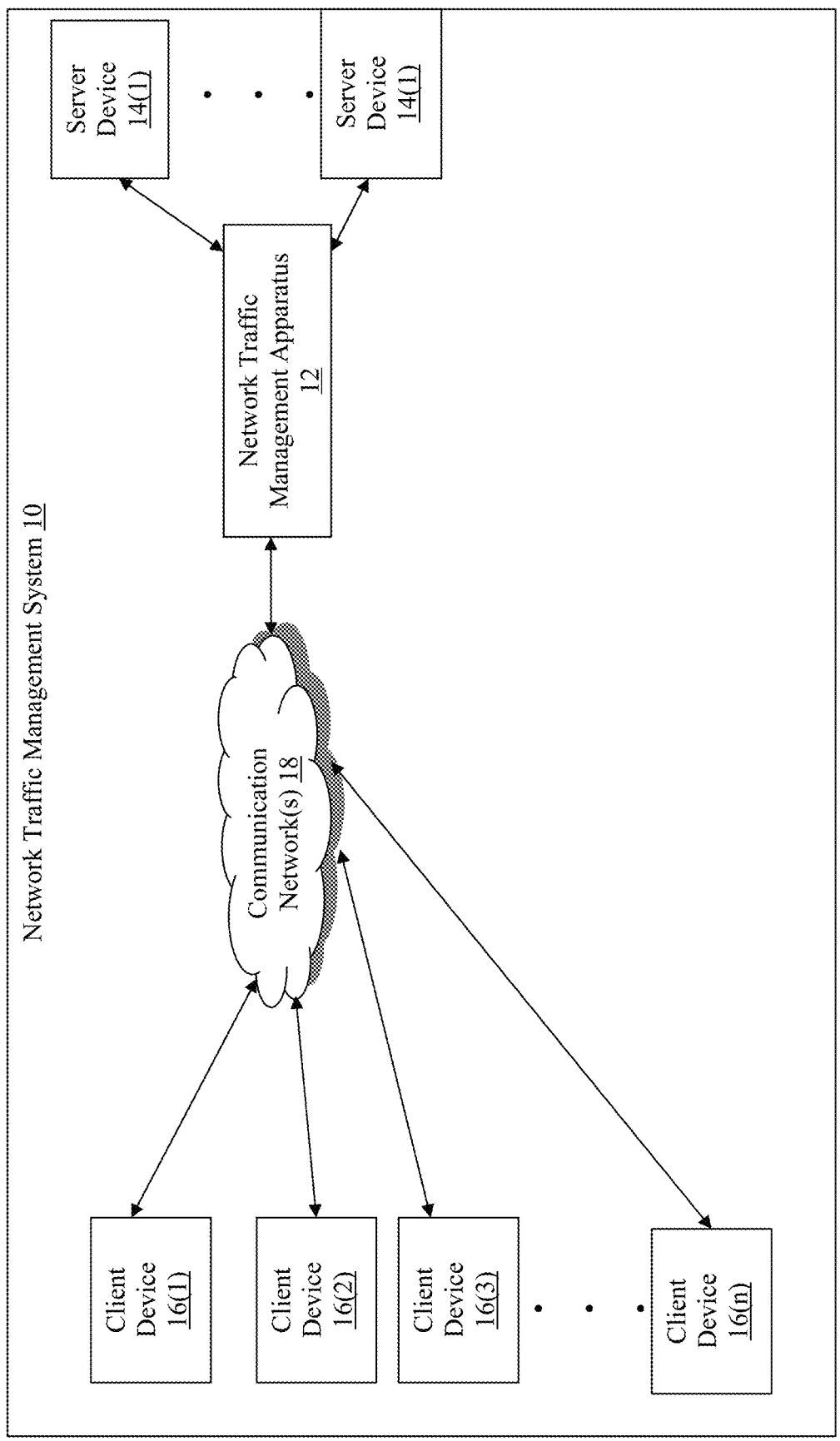
FIG. 1 is a block diagram of an exemplary network traffic management system with a network traffic management apparatus.

Referring to FIG. 1, an exemplary network environment that incorporates an exemplary network traffic management system 10 is illustrated. The network traffic management system 10 in this example includes a network traffic management apparatus 12 that is coupled to server devices 14(1)-14(n) and client devices 16(1)-16(n) via communication network(s) 18, although the network traffic management apparatus 12, server devices 14(1)-14(n), and/or client devices 16(1)-16(n) may be coupled together via other topologies. The network traffic management system 10 may include other network devices such as one or more routers and/or switches, for example, which are well known in the art and thus will not be described herein. This technology provides a number of advantages including providing methods, non-transitory computer readable media, network traffic management systems, and network traffic management apparatuses that dynamically match fingerprints to more effectively and efficiently authenticate and track identities of client devices.

In this particular example, the network traffic management apparatus 12, server devices 14(1)-14(n), and client devices 16(1)-16(n) are dedicated hardware devices. However, one or more of the network traffic management apparatus 12, server devices 14(1)-14(n), or client devices 16(1)-16(n) can also be implemented in software within one or more other devices in the network traffic management system 10. As used herein, the term "module" refers to either an implementation as a dedicated hardware device or apparatus, or an implementation in software hosted by another hardware device or apparatus that may be hosting one or more other software components or implementations.

As one example, the network traffic management apparatus 12, as well as any of its components, models, or applications, can be a module implemented as software executing on one of the server devices 14(1)-14(n), and many other permutations and types of implementations can also be used in other examples. Moreover, any or all of the network traffic management apparatus 12, server devices 14(1)-14(n), and client devices 16(1)-16(n), can be implemented, and may be referred to herein, as a module.

Figure 2:
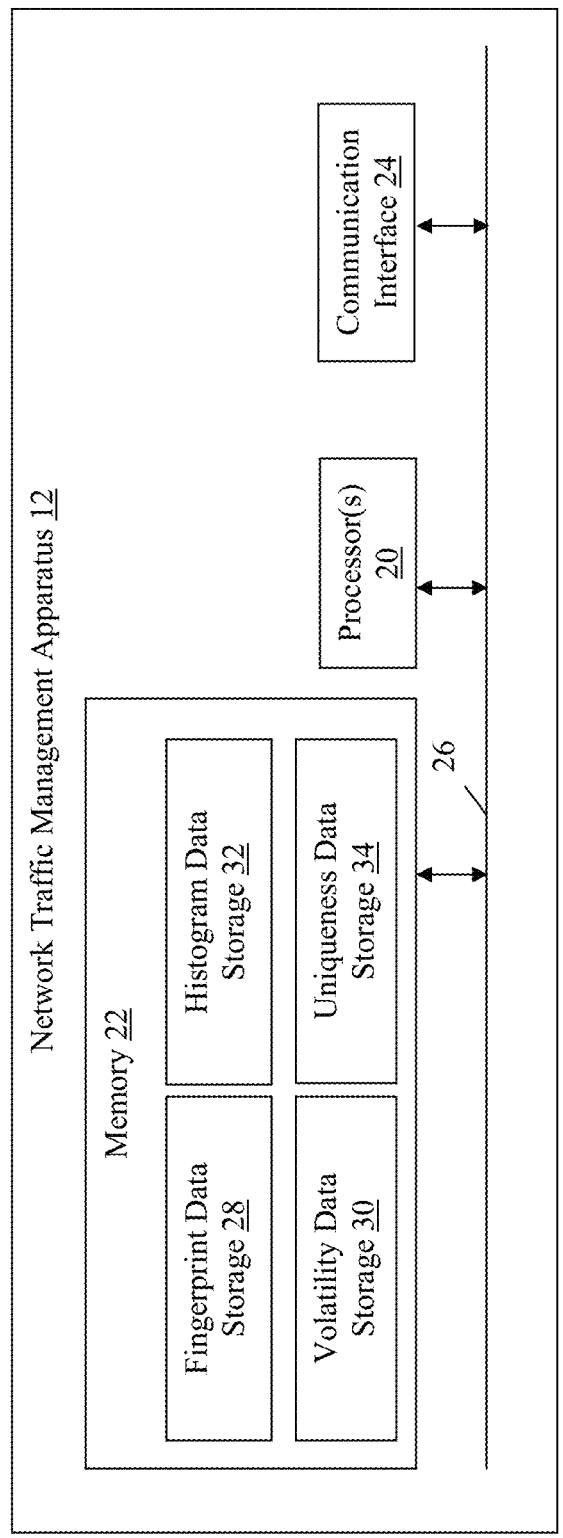
FIG. 2 is a is a block diagram of an exemplary network traffic management apparatus.

Referring to FIGS. 1-2, the network traffic management apparatus 12 of the network traffic management system 10 may perform any number of functions including providing dynamic fingerprint matching, managing network traffic, load balancing network traffic across the server devices 14(1)-14(n), or accelerating network traffic associated with web applications hosted by one or more of the server devices 14(1)-14(n). The network traffic management apparatus 12 includes one or more processors 20, a memory 22, and/or a communication interface 24, which are coupled together by a bus 26 or other communication link, although the network traffic management apparatus 12 can include other types and/or numbers of elements in other configurations.

The processor(s) 20 of the network traffic management apparatus 12 may execute programmed instructions stored in the memory 22 of the network traffic management apparatus 12 for the any number of the functions identified above. The processor(s) 20 of the network traffic management apparatus 12 may include one or more CPUs or general purpose processors with one or more processing cores, for example, although other types of processor(s) can also be used.

The memory 22 of the network traffic management apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 20, can be used for the memory 22.

Figure 3:
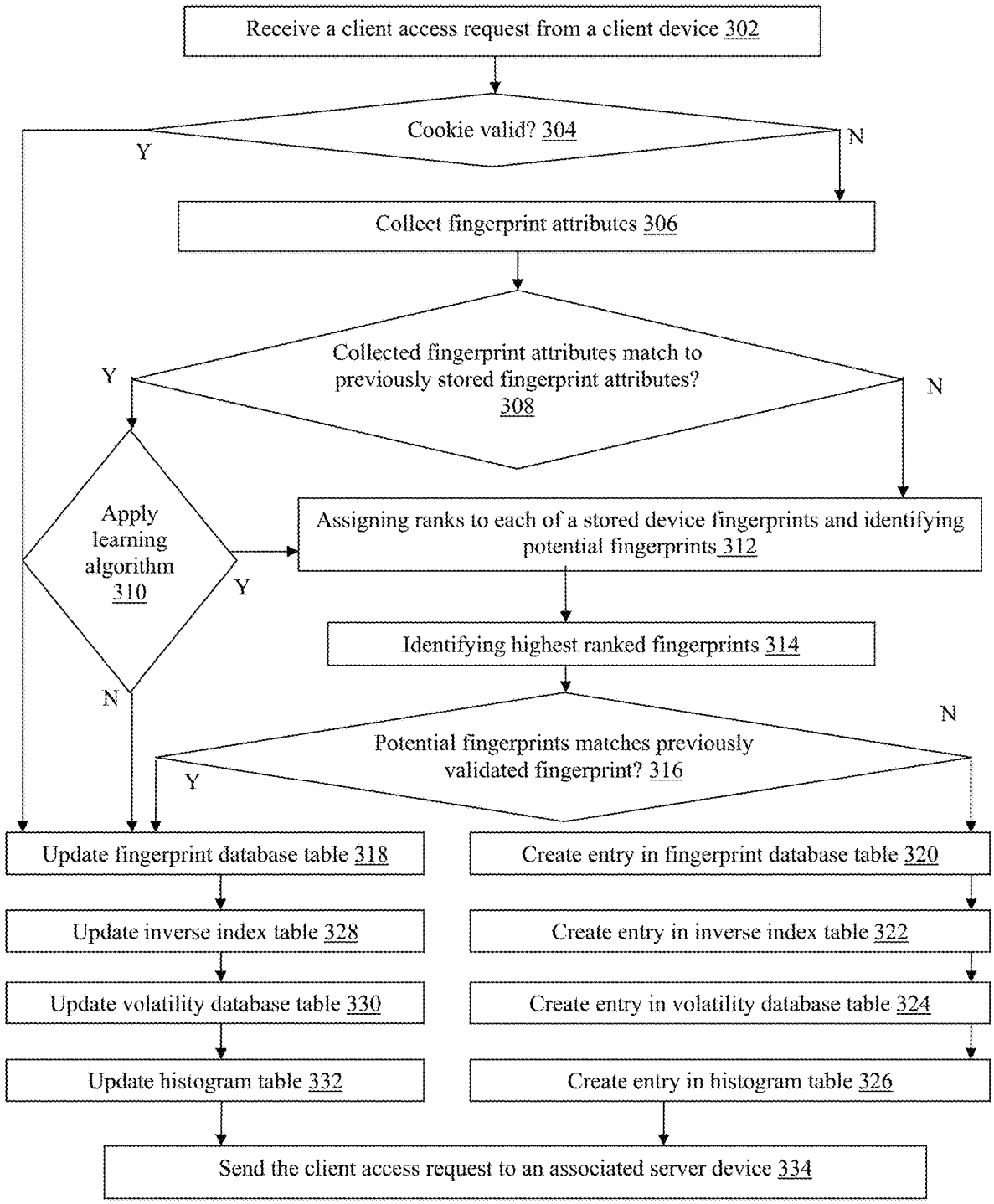
FIG. 3 is a flowchart of an exemplary method for dynamic fingerprint matching.

Accordingly, the memory 22 of the network traffic management apparatus 12 can store one or more applications that can include computer executable instructions that, when executed by the network traffic management apparatus 12, cause the network traffic management apparatus 12 to perform actions, such as to transmit, receive, or otherwise process messages, for example, and to perform other actions described and illustrated below with reference to FIGS. 3-4. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the network traffic management apparatus 12 itself, may be located in virtual server(s) running in a cloud-based computing environment rather than being tied to one or more specific physical network computing devices. Also, the application(s) may be running in one or more virtual machines (VMs) executing on the network traffic management apparatus 12. Additionally, in one or more embodiments of this technology, virtual machine(s) running on the network traffic management apparatus 12 may be managed or supervised by a hypervisor.

In this particular example, the memory 22 of the network traffic management apparatus includes 12 fingerprint data storage, uniqueness data storage, volatility data storage, histogram data storage, although the memory can include other policies, modules, databases, or applications, for example.

The fingerprint data storage 28 may include one or more fingerprint attribute data collected from the client devices 16(1)-16(n) and may further include storing the collected attribute data in a fingerprint database table. The fingerprint attribute data may include browser versions utilized by the client devices 16(1)-16(n), the type of hardware device utilized by the client devices 16(1)-16(n), the type of operating system of the client devices 16(1)-16(n) (e.g. Windows, Linux, Mac OS), the screen resolution of the client devices 16(1)-16(n), font sizes utilized in the browser. Although, any other type of software and/or hardware features of the client devices 16(1)-16(n) may also be included as fingerprint attribute data. The collected fingerprint attribute data is stored in a fingerprint database table of Table 1. Table 1 shows the fingerprint database table which includes, the Device ID, Fingerprint Update History, Fingerprint Attribute 1, Fingerprint Attribute 2, Fingerprint Attribute 3. Although, any other number and types of attributes may be included in the Table 1. Device ID is a unique identifier assigned by the network traffic management apparatus 12 to uniquely identity each of the client devices 16(1)-16(n). The Device ID's are first assigned when each of the client devices 16(1)-16(n) first access the network. By way of example, Fingerprint 1 is assigned to a client device 1, Fingerprint 2 is assigned to a client device 2, and Fingerprint 3 is assigned to a client device 3.

In this example, the Fingerprint Attribute 1, includes the attribute value <Value 1.A> associated with the Fingerprint 1, <Value 1.A> associated with the Fingerprint 2, and <Value 1.B> associated with the Fingerprint 3. Additionally, in this example, the Fingerprint Attribute 1 is again related to a browser version associated with a first type of browser utilized by the client devices 16(1)-16(n). The values <Value 1.A>, <Value 1.A>, <Value 1.B> of the Fingerprint Attribute 1 are the browser version numbers, by way of example: client device 1 is running on Microsoft Internet Explorer (IE) web browser with IE Version 4.0 has a <Value 1.A> which is <IE Version 4.0>; client device 2 is running on IE Version 4.0 has a <Value 1.A> which is <IE Version 4.0>; and client device 3 is running on Google Chrome and with a Version 5.5 has a <Value 1.B> which is <Chrome Version 5.5>, although other types of browsers may be utilized. Further, the Update History associated with the Fingerprint Attribute 1 values may include the date when the values were last updated. In this example, the Update History associated with the Fingerprint Attribute 1 of Fingerprint 1 is

| <Jan. 1$^{st}$, 2016> | <Jan. 3$^{rd}$, 2016> |
|---|---|

In this example, the Update History indicates that Fingerprint Attribute 1, <Value 1.A> which is <IE Version 4.0> for Fingerprint 1 was last updated on Jan. 3, 2016 and previous to that update, the Fingerprint Attribute 1 update was recorded on Jan. 1, 2016.

Update History for Fingerprint Attribute 1 of Fingerprint 2:

| <Dec. 10$^{th}$, 2015> | <Jan. 2$^{nd}$, 2016> |
|---|---|

In this example, the Update History indicates that Fingerprint Attribute 1, <Value 1.A> which is <IE Version 4.0> for Fingerprint 2 was last updated on Jan. 2, 2016 and previous to that update, the Fingerprint Attribute 1 update was recorded on Dec. 10, 2015.

Further Update History for Fingerprint Attribute 1 of Fingerprint 3:

| <Dec. 15$^{th}$, 01.00 PM, 2015> | <Dec. 15$^{th}$, 04.00 PM 2015> |
|---|---|

In this example, the Update History indicates that Fingerprint Attribute 1, <Value 1.B> which is <Chrome Version 5.5> for Fingerprint 3 was last updated on December 15$^{th}$ at 4.00 PM, 2015 and previous to that update, the Fingerprint Attribute 1 update was recorded on December 15$^{th}$ at 1.00 PM, 2015.

Similarly, Fingerprint Attribute 2 may be an operating system version associated with the client devices 16(1)-16(n). The operating system (OS) version may include, Windows OS, Linux OS, Mac OS, although other types of OS available may be utilized. The values <Value 2.A>, <Value 2.B>, <Value 2.C> of the Fingerprint Attribute 2 are the OS version numbers, by way of example: client device 1 is running on Windows OS 7.0 has a <Value 2.A> which is <Windows OS Version 7.0>; client device 2 is running on Mac OS Version X has a <Value 2.B> which is <Mac OS Version X>; and client device 3 is running on Windows OS 2000 has a <Value 2.C> which is <Windows OS 2000>. Further, the Update History associated with the Fingerprint Attribute 2 values may include the date when the values were last updated. In this example, the Update History associated with the Fingerprint Attribute 2 for Fingerprint 1 is

| <Dec. 1$^{st}$, 2015> | <Jan. 15$^{th}$, 2016> |
|---|---|

In this the Update History indicates that Fingerprint Attribute 2, <Value 2.A> which is <Windows OS Version 7.0> for Fingerprint 1 was last updated on Jan. 15, 2016 and previous to that update, the Fingerprint Attribute 2 update was recorded on Dec. 1 2015. Similarly, Fingerprint Attribute 2, for Fingerprint 2 and Fingerprint 3 are set up and operate in the same manner as illustrated and described by way of the examples herein. Further, Fingerprint Attribute 3 may be associated with any other software and or hardware attribute associated with client devices 16(1)-16(n) and the attributes and corresponding values for each of the fingerprints are set up and operate in the same manner as illustrated and described by way of the examples herein.

The Fingerprint Update History provides the historical dates of when the fingerprint-1, fingerprint-2 and fingerprint-3 had their attribute values updated.

The uniqueness data storage 34 may include an inverse index table that includes uniqueness values assigned to each of the fingerprint attributes in the fingerprint database table and a fingerprint reference list that includes Device ID associated with the fingerprint attributes. In this example, the uniqueness value is determined using the formula 1−a tan(vf/nv), where of is the value frequency (number of times the value appears) and nv is the number of values (total number of fingerprint records), although other techniques and parameters can be considered to determine the uniqueness value. By way of example, if value 2.A (Windows OS 2000) appears in 130,512 fingerprint records out of a total of 1,000,000 records, the uniqueness would be 1−a tan (130512/1000000) and that is approximately equal to 0.870. By way of example, Table 1 shows the Device ID's to include Fingerprint 1, Fingerprint 2 or Fingerprint 3 although any number of Device ID's may be included. The more unique the fingerprint attribute is, the higher value number is assigned to it. In this example, the inverse index table of Table 2 which includes uniqueness values assigned to each of the fingerprint attributes based on their uniqueness. The determination of uniqueness by the network traffic management apparatus 12 is explained in detail below. As shown in the Table 1 and Table 2, the fingerprint attribute 2 with Value 2.A of Fingerprint 1 is assigned a uniqueness value of 0.87. In this example, Value 2.A which in this example, is <Windows OS 2000> is not in any other Fingerprint records and therefore is assigned a higher uniqueness value in comparison to Value 1.A which is assigned a uniqueness value of 0.453 because Value 1.A is in two fingerprint records. Value 1.A has Fingerprint 1 sharing the same Value 1.A, which in this example is the <IE version 4.0> with Fingerprint 2. As a result Value 1.A is assigned a lower a uniqueness value of 0.453 because Value 1.A is the same for two fingerprints, i.e. fingerprints 1 and 2 in this example. Similarly, all the values are assigned uniqueness values based on the attribute values. Further, the fingerprint reference list column identifies common fingerprints associated with the same attribute values. By way of example, for the same attribute value <Value 1.A>, Fingerprint 1 and Fingerprint 2 are considered potential fingerprints.

TABLE 2

Illustration of the inverse index table

| Attribute Value | Uniqueness Value | Fingerprint Reference List |
|---|---|---|
| Value 1.A | 0.453 | Fingerprint 1, Fingerprint 2... |
| Value 1.B | 0.30 | Fingerprint 3... |
| Value 2.A | 0.87 | Fingerprint 1... |
| Value 2.B | 0.53 | Fingerprint 2... |
| Value 2.C | 0.20 | Fingerprint 3... |
| Value 3.A | 0.251 | Fingerprint 1... |
| Value 3.B | 0.40 | Fingerprint 2... |
| Value 3.C | 0.30 | Fingerprint 3... |

The volatility data storage 30 may include attribute volatility table which includes a volatility range associated with each of the attributes and the change history range/histogram associated with the attributes. Table 3 shows the volatility table which includes attributes column, volatility range column and change history range column. The volatility range values in one example, may be automatically learned based on previous updates for that attribute associated with other client devices. In another example, the volatility range may be predetermined and stored by a system administrator. In this example, for Table 3, the Attribute 1 is the browser version number with a volatility range of 2 days. The volatility range indicates that, by way of example, the browser versions would be changed every 2 days and the Change History Range indicates all the dates when the browser updates occurred over a time period. In this example, as the updates are released every 2 days, the change history range would be 2 days apart. Similarly, for Attribute 2 and for Attribute 3 the associated volatility ranges and change history range are included in the table 3.

TABLE 3

Attribute volatility table

| Attributes | Volatility Range | Change History Range |
|---|---|---|
| Attribute 1 | 2 days | <Date>, <Date>, <Date>, ... |
| Attribute 2 | 15 days | <Date>, <Date>, <Date>, ... |
| Attribute 3 | 3 hours | <Date>, <Date>, <Date>, ... |

The histogram data storage 32 may includes a histogram table that includes a list of fingerprints that have been previously determined to be successfully identified as the correct fingerprint based on the potential fingerprint scores.

Referring back to FIGS. 1-2, the communication interface 24 of the network traffic management apparatus 12 operatively couples and communicates between the network traffic management apparatus 12, the server devices 14(1)-14(n), and/or the client devices 16(1)-16(n), which are all coupled together by the communication network(s) 18, although other types and/or numbers of communication networks or systems with other types and/or numbers of connections and/or configurations to other devices and/or elements can also be used.

By way of example only, the communication network(s) 18 can include local area network(s) (LAN(s)) or wide area network(s) (WAN(s)), and can use TCP/IP over Ethernet and industry-standard protocols, although other types and/or numbers of protocols and/or communication networks can be used. The communication network(s) 18 in this example can employ any suitable interface mechanisms and network communication technologies including, for example, tele-traffic in any suitable form (e.g., voice, modem, and the like), Public Switched Telephone Network (PSTNs), Ethernet-based Packet Data Networks (PDNs), combinations thereof, and the like.

While the network traffic management apparatus 12 is illustrated in this example as including a single device, the network traffic management apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the network traffic management apparatus 12.

Additionally, one or more of the devices that together comprise the network traffic management apparatus 12 in other examples can be standalone devices or integrated with one or more other devices or apparatuses, such as one or more of the server devices 14(1)-14(n), for example. Moreover, one or more of the devices of the network traffic management apparatus 12 in these examples can be in a same or a different communication network including one or more public, private, or cloud networks, for example.

Each of the server devices 14(1)-14(n) of the network traffic management system 10 in this example includes one or more processors, a memory, and a communication interface, which are coupled together by a bus or other communication link, although other numbers and/or types of network devices could be used. The server devices 14(1)-14(n) in this example process requests received from the client devices via the communication network(s) according to the HTTP-based application RFC protocol, for example. Various applications may be operating on the server devices and transmitting data (e.g., files or Web pages) to the client devices via the network traffic management apparatus in response to requests from the client devices 16(1)-16(n).

Accordingly, in some examples, one or more of the server devices 14(1)-14(n) process login and other requests received from the client devices 16(1)-16(n) via the communication network(s) 18 according to the HTTP-based application RFC protocol, for example. A web application may be operating on one or more of the server devices 14(1)-14(n) and transmitting data (e.g., files or web pages) to the client devices 16(1)-16(n) (e.g., via the network traffic management apparatus 12) in response to requests from the client devices 16(1)-16(n). The server devices 14(1)-14(n) may be hardware or software or may represent a system with multiple servers in a pool, which may include internal or external networks.

Although the server devices 14(1)-14(n) are illustrated as single devices, one or more actions of each of the server devices 14(1)-14(n) may be distributed across one or more distinct network computing devices that together comprise one or more of the server devices 14(1)-14(n). Moreover, the server devices 14(1)-14(n) are not limited to a particular configuration. Thus, the server devices 14(1)-14(n) may contain network computing devices that operate using a master/slave approach, whereby one of the network computing devices of the server devices 14(1)-14(n) operate to manage or otherwise coordinate operations of the other network computing devices. The server devices 14(1)-14(n) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the server devices 14(1)-14(n) can operate within the network traffic management apparatus 12 itself rather than as a stand-alone server device communicating with the network traffic management apparatus 12 via communication network(s) 18. In this example, the one or more of the server devices 14(1)-14(n) operate within the memory 22 of the network traffic management apparatus 12.

The client devices 16(1)-16(n) of the network traffic management system 10 in this example include any type of computing device that can exchange network data, such as mobile, desktop, laptop, or tablet computing devices, virtual machines (including cloud-based computers), or the like. Each of the client devices 16(1)-16(n) in this example includes a processor, a memory, and a communication interface, which are coupled together by a bus or other communication link (not illustrated), although other numbers or types of components could also be used.

The client devices 16(1)-16(n) may run interface applications, such as standard web browsers or standalone client applications, which may provide an interface to make requests for, and receive content stored on, one or more of the server devices 14(1)-14(n) via the communication network(s) 18. The client devices 16(1)-16(n) may further include a display device, such as a display screen or touchscreen, or an input device, such as a keyboard for example (not illustrated). Additionally, one or more of the client devices 16(1)-16(n) can be configured to execute software code (e.g., JavaScript code within a web browser) in order to log client-side data and provide the logged data to the network traffic management apparatus 12, as described and illustrated in more detail later.

Although the exemplary network traffic management system 10 with the network traffic management apparatus 12, server devices 14(1)-14(n), client devices 16(1)-16(n), and communication network(s) 18 are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network traffic management system 10, such as the network traffic management apparatus 12, client devices 16(1)-16(n), or server devices 14(1)-14(n), for example, may be configured to operate as virtual instances on the same physical machine. In other words, one or more of the network traffic management apparatus 12, client devices 16(1)-16(n), or server devices 14(1)-14(n) may operate on the same physical device rather than as separate devices communicating through communication network(s) 18. Additionally, there may be more or fewer network traffic management apparatus 12, client devices 16(1)-16(n), or server devices 14(1)-14(n) than illustrated in FIG. 1. The client devices 16(1)-16(n) could also be implemented as applications on the network traffic management apparatus 12 itself as a further example.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof.

The examples may also be embodied as one or more non-transitory computer readable media having instructions stored thereon, such as in the memory 22, for one or more aspects of the present technology, as described and illustrated by way of the examples herein. The instructions in some examples include executable code that, when executed by one or more processors, such as the processor(s) 20, cause the processors to carry out steps necessary to implement the methods of the examples of this technology that are described and illustrated herein.

An exemplary method of dynamic fingerprint matching will now be described with reference to FIGS. 1-4. Referring more specifically to FIG. 3A, in a first step 302 in this example, the network traffic management apparatus 12 of the network traffic management system 10 receives a client access request from the client devices 16(1)-16(n) to access one or more applications at one or more server devices 14(1)-14(n). The received client access request includes a cookie. In this example, the client access request is received from the client device 16(1).

In step 304, the network traffic management apparatus 12 of the network traffic management system 10 determines if the received cookie is valid. The network traffic management apparatus 12 determines if the received cookie is valid based on the timestamp of the cookie, IP address associated with the cookie and the cryptography of the cookie. The network traffic management apparatus 12 determines if the timestamp associated with the cookie has expired in comparison to a predefined time threshold, by way of example, 15 minutes. If the received cookie has a timestamp within 15 minutes the cookie is determined to be a valid cookie. The network traffic management apparatus 12 determines if the IP address associated with the cookie matches with a previously stored list of valid IP addresses then the cookie is determined to be a valid cookie. The network traffic management apparatus 12 determines if the cryptography associated with a key of the cryptography then the cookie is determined to be a valid cookie. If either one of the timestamp of the cookie, IP address associated with the cookie and the cryptography of the cookie fails the validation then the cookie is determined to be invalid and the method proceeds to step 306. When all three of the timestamp of the cookie, IP address associated with the cookie and the cryptography of the cookie are successfully validated then the cookie is determined to be valid and the method proceeds to step 318.

In step 306, the network traffic management apparatus 12 of the network traffic management system 10 collects fingerprint attributes associated with the client device 16(1). The fingerprint attributes may include for example client device type, user profile information associated with the user of the client device 16(1), an application type utilized by the client device 16(1), and/or a web browser type utilized by the client device 16(1), although other types of attributes may be used. In this example, each of the attributes also includes an update history and attribute values, such as Value 1.A, Value 1.B, Value 2.A, Value 2.B, Value 2.C, Value 3.A, Value 3.B, Value 3.0 in this example. By way of example, if the attribute is a web browser, then the attribute value may be a browser version number. The network traffic management apparatus 12 also checks a browser local storage of a browser associated with the client device 16(1) to collect fingerprint attributes and client device identifier (ID) of the requesting client device 16(1) stored in the browser local storage. The collected client device ID is an encrypted identifier which is decrypted by the network traffic management apparatus 12 to determine the client device ID. A client device ID is an identifier assigned to each requesting client device 16(1) by the network traffic management apparatus 12. The client device ID associated with the requesting client device 16(1) is stored as a record or a Fingerprint in the fingerprint data storage stored in the memory. Table 1 of FIG. 5A shows a fingerprint database table that includes, a client device ID for different client devices 16(1), 16 (2) and 16(3) stored as, by way of example, Fingerprint-1, Fingerprint-2 and Fingerprint-3. By way of example, the Fingerprint-1 is associated with a client device-1, the Fingerprint-2 is associated with a client device-2, and the Fingerprint-3 is associated with a client device-3. Further, each fingerprint record, Fingerprint-1, Fingerprint-2 and Fingerprint-3 is a network identifier of the client device 16(1). The network identifier may include an IP address and/or MAC address associated with the requesting client device 16(1). Table 1 shows the attributes collected for Fingerprint-1 may include, fingerprint attribute-1, fingerprint attribute-2, fingerprint attribute-3. The network traffic management apparatus 12 of the network traffic management system 10 collects fingerprint attributes associated with the client device ID. Upon collecting the fingerprint attributes the method proceeds to step 308. By way of example, the fingerprint database Table 1 may include any number of client device ID's and any number of fingerprint attributes.

In step 308, the network traffic management apparatus 12 of the network traffic management system 10 determines if the collected fingerprint attributes from the browser local storage in the browser of client device 16(1) in step 306 match to previously stored fingerprint attributes in the fingerprint database Table 1. The network traffic management apparatus 12 compares the collected fingerprint attributes of step 306 to the fingerprint attributes of stored device fingerprints. In this example, the stored device fingerprints include, Fingerprint 1, Fingerprint 2 and/or Fingerprint 3 of Table 1 that are previously stored fingerprint attributes. Upon a match the network traffic management apparatus 12 creates a list of client device ID that have fingerprint attributes that match with the collected fingerprint attributes. When the network traffic management apparatus 12 determines the collected attributes match with a previously stored fingerprint attributes associated with one of a client device ID then the requesting client device 16(1) is validated as a known device and the method proceeds to step 310. When the network traffic management apparatus 12 determines the collected fingerprint attributes do not match with the previously stored fingerprint attributes associated with one of a client device ID then the method proceeds to step 312. This matching to validate the client device 16(1) also helps in identifying that no other malicious entity has made the request by spoofing the client device network identifier over the network to determine any potential security threats and/or attacks.

In step 310, the network traffic management apparatus 12 of the network traffic management system 10 determines if a learning algorithm is to be applied based on determining that the collected attributes match with a previously stored fingerprint attributes associated with a client device ID. Even though the there is a matching client device ID with the same attributes, the system administrator may still assign policies causing the network traffic management apparatus 12 to proceed to step 312 to apply a learning algorithm to further learn the results of the method. If the network traffic management apparatus 12 of the network traffic management system 10 determines that the system administrator has not assigned policies causing the network traffic management apparatus 12 to apply a learning algorithm then the method proceeds to step 318. If the network traffic management apparatus 12 of the network traffic management system 10 determines that the learning algorithm is to be applied then the method proceeds to step 312.

In step 312, the network traffic management apparatus 12 of the network traffic management system 10 assigns ranks to each of the stored device fingerprints when the comparison fails to identify any stored fingerprint attributes that match with the collected fingerprint attributes in step 308. When the network traffic management apparatus 12 determines in step 308 that none of the stored device fingerprints match with the collected fingerprint attributes, then the network traffic management apparatus 12 assigns ranks to each of the previously stored device fingerprints based on a comparison of fingerprint database table with inverse index table and volatility database table. The network traffic management apparatus 12 performs a comparison between the fingerprint database table, the inverse index table and the attribute volatility table. The network traffic management apparatus 12 compares the update history records for the identified list of potential fingerprints in the inverse index table with the volatility ranges associated with each of the fingerprints to determine one of the fingerprints from the list of potential fingerprints to be the fingerprint associated with the stored device fingerprints. By way of example, the network traffic management apparatus 12 compares the value of <Value 1.A> for Attribute 1 of Fingerprint 1 and Fingerprint 2 with the volatility range and update history of Attribute 1. In this example, when the browser version value is <IE Version 4.0>, then the network traffic management apparatus 12 determines from the attribute volatility table the attribute 1<Value 1.A> has a volatility range of 2 days, and the most recent change history range of Jan. 1, 2016 & Jan. 3, 2016 for Fingerprint 1 and Dec. 10, 2015 & Jan. 2, 2016 for Fingerprint 2. As the volatility range is of 2 days, this indicates that version update of Fingerprint 2 on Dec. 20, 2015 & Jan. 2, 2016 with volatility range of 19 days is incorrect, as it does not meet the volatility range of 2 days associated with the Attribute 1. Accordingly, the network traffic management apparatus 12 determines that the Fingerprint 2 is an unsuccessful match. Further, Fingerprint 1 has volatility date range of 2 days from on Jan. 1, 2016 & Jan. 3, 2016 which meets the volatility date range of 2 days associated with the Attribute 1 and is the correct range and that thus the network traffic management apparatus 12 determines Fingerprint 1 to be a successful match. Thus, the network traffic management apparatus 12 determines that as the Fingerprint 2 is an unsuccessful match and Fingerprint 1 is a successful match. These comparison results for a successful match or an unsuccessful match is utilized to assign ranks to each of the fingerprints.

The network traffic management apparatus 12 of the network traffic management system 10 assigns ranks to each of the stored device fingerprints based on the comparison. When, Fingerprint 1 is a successful match and Fingerprint 2 is an unsuccessful match, thus the network traffic management apparatus 12 assigns Fingerprint 2 a lower potential fingerprint rank of 2 in comparison to Fingerprint 1, which is assigned a higher potential fingerprint rank of 1 for equal values of <Value 1.A>. The network traffic management apparatus 12 determines for Fingerprint-1 the value for <Value 1.A> is 0.453 and for Fingerprint-2 the value of <Value 1.A> is also 0.453. Further, the network traffic management apparatus 12 determines Fingerprint-1 to have rank of 1 as all three attribute values <Value 1.A=0.453>, <Value 2.A=0.87> and <Value 3.A=0.851> to have the highest uniqueness values in comparison to the attribute uniqueness values associated with Fingerprint-2 which is <Value 1.A=0.453>, <Value 2.B=0.53>, <Value 3.B=0.40> and the Fingerprint-2 is assigned a rank 2 and further in comparison to Fingerprint-3 which is <Value 3.A=0.251>, <Value 3.B=0.40>, <Value 3.C=0.30> and Fingerprint-3 is assigned a rank 3. In another example, the network traffic management apparatus 12 assigns a rank 1 to both of the fingerprints Fingerprint 1 and Fingerprint 2.

In step 314, the network traffic management apparatus 12 of the network traffic management system 10 identifies the highest ranked fingerprint. In this example, based on the ranks assigned in step 312, the network traffic management apparatus 12 identifies Fingerprint-1 to be assigned the highest rank 1 and the method proceeds to step 316. In another example, the network traffic management apparatus 12 identifies the highest ranked fingerprint to be both of the fingerprints Fingerprint 1 and Fingerprint 2 and the method proceeds to step 316.

In step 316, the network traffic management apparatus 12 of the network traffic management system 10 determines if the highest ranked fingerprint matches with one of a previously validated fingerprint in a histogram database. The histogram data storage stores a histogram table that includes a list of fingerprints that have been previously validated to be successfully identified as the correct fingerprint based on earlier potential fingerprint rankings. The network traffic management apparatus 12, in this example, determines if the Fingerprint-1 matches with one of the fingerprints from the list of stored fingerprints in the histogram data storage. When the network traffic management apparatus 12 determines that the attribute values of Fingerprint-1 does not match with the attribute values of any of the fingerprints from the list of stored fingerprints then the method takes the No branch to step 320. In another example, the network traffic management apparatus 12 determines if both of the highest ranked fingerprints, Fingerprint 1 and Fingerprint 2 matches with one of the fingerprints from the list of stored fingerprints in the histogram data storage. When the network traffic management apparatus 12 determines that the attribute values of both of the highest ranked fingerprints, Fingerprint 1 and Fingerprint 2 do not match with the attribute values of any of the fingerprints from the list of stored fingerprints then the method takes the No branch to step 320.

In step 320, the network traffic management apparatus 12 of the network traffic management system 10 creates an entry in a fingerprint database table with the collected fingerprint attributes. The network traffic management apparatus 12 updates the Table-1 for each of the fingerprint records, by way of example, Fingerprint-1, Fingerprint-2 and Fingerprint-3. Each of the fingerprint record is updated with its corresponding fingerprint attributes-1, fingerprint attribute-2 and fingerprint attribute-3.

In step 322, the network traffic management apparatus 12 of the network traffic management system 10 creates an entry in the Table-2 inverse index table based on the attribute values stored in the fingerprint database table. The network traffic management apparatus 12 determines a uniqueness value associated with each of the attributes values based on the attribute values stored in the fingerprint database table. Further, the network traffic management apparatus 12 determines a list of potential fingerprints. Table 2 shows uniqueness values assigned to each of the attribute values based on their uniqueness. As shown in the Table 2, the attribute 2 with Value 2.A of Fingerprint 1 is assigned a uniqueness value of 0.87. Here, Value 2.A which in this example, is <Windows OS 2000> is not being shared with any other Fingerprint records it is given a higher uniqueness value in comparison to Value 1.A which is assigned a uniqueness value of 0.453 as it is shared amongst two fingerprint records. Value 1.A has Fingerprint 1 sharing the same Value 1.A, which in this example is the <IE version 4.0> with Fingerprint 2. As a result Value 1.A is assigned a lower a uniqueness value of 0.452 as this value is being shared amongst two fingerprint records it is not completely a unique value. Similarly, all the other attribute values are assigned uniqueness values. Further, the fingerprint reference list column identifies Fingerprint 1 and Fingerprint 2 to be potential fingerprints associated with the same attribute value <Value 1.A>.

TABLE 2

Illustration of the inverse index table

| Attribute Value | Uniqueness Value | Fingerprint Reference List |
|---|---|---|
| Value 1.A | 0.453 | Fingerprint 1, Fingerprint 2 . . . |
| Value 1.B | 0.30 | Fingerprint 3 . . . |
| Value 2.A | 0.87 | Fingerprint 1 . . . |
| Value 2.B | 0.53 | Fingerprint 2 . . . |
| Value 2.C | 0.20 | Fingerprint 3 . . . |
| Value 3.A | 0.251 | Fingerprint 1 . . . |
| Value 3.B | 0.40 | Fingerprint 2 . . . |
| Value 3.C | 0.30 | Fingerprint 3 . . . |

In step 324, the network traffic management apparatus 12 of the network traffic management system 10 creates an entry in the attribute volatility database table. The Table 3 is an attribute volatility database table which includes a volatility range associated with each of the attributes and the change history range/histogram associated with the fingerprint attributes. Each of the attributes is associated with a volatility range. The volatility range in one example, may be automatically learned based on previous updates for that attribute associated with other client devices. In other example, the volatility range may be predetermined and stored by a system administrator. In this example, for the Table 3, the Attribute 1 is the browser version number with a volatility range of 2 days. The volatility range indicates that, by way of example, the browser versions would be changed every 2 days and the Change History Range indicates all the dates when the browser updates occurred over a time period. In this example, as the updates are released every 2 days, the change history range would be 2 days apart. Similarly, for Attribute 2 and for Attribute 3 the associated volatility ranges and change history range are included in the Table 3.

TABLE 3

Attribute volatility table

| Attributes | Volatility Range | Change History Range |
|---|---|---|
| Attribute 1 | 2 days | <Date>, <Date>, <Date>, . . . |
| Attribute 2 | 15 days | <Date>, <Date>, <Date>, . . . |
| Attribute 3 | 3 hours | <Date>, <Date>, <Date>, . . . |

In step 326, the network traffic management apparatus 12 of the network traffic management system 10 creates an entry in the histogram database table based on the fingerprints that have previously been determined to be successfully identified as the correct fingerprint. Based on a successfully match in step 316 of the Fingerprint-1 the network traffic management apparatus 12 updates the list of fingerprints to be successfully identified as the correct fingerprint to include Fingerprint-1. The Fingerprint-1 is stored with a timestamp of when it was successful matched and method proceeds to step 334.

If back in step 316, the attribute values of Fingerprint-1 are determined to match with the attribute values of another fingerprint from the list of stored fingerprints then the method takes the Yes branch to step 318. In another example, from both of the highest ranked fingerprints Fingeprint-1 and Fingerprint-2, if back in step 316 the attribute values of Fingerprint-1 are determined to match with the attribute values of another fingerprint from the list of stored fingerprints then the method takes the Yes branch to step 318.

In step 318, the network traffic management apparatus 12 of the network traffic management system 10 updates the fingerprint database table with the collected fingerprint attributes. Further, the method may reach the step 318 from steps 304 and 310. The network traffic management apparatus 12 updates the Table-1 for each of the fingerprint records, by way of example, Fingerprint-1, Fingerprint-2 and Fingerprint-3. Each of the fingerprint record is updated with its corresponding fingerprint attributes-1, fingerprint attribute-2 and fingerprint attribute-3.

In step 328, the network traffic management apparatus 12 of the network traffic management system 10 updates the Table-2 inverse index table based on the attribute values stored in the fingerprint database table. The network traffic management apparatus 12 determines a uniqueness value associated with each of the attributes values based on the attribute values stored in the fingerprint database table. Further, the network traffic management apparatus 12 determines a list of potential fingerprints. Table 2 shows uniqueness values assigned to each of the attribute values based on their uniqueness. As shown in the Table 2, the attribute 2 with Value 2.A of Fingerprint 1 is assigned a uniqueness value of 0.87. Here, Value 2.A which in this example, is the <Windows OS 2000> is not being shared with any other Fingerprint records it is given a higher uniqueness value in comparison to Value 1.A which is assigned a uniqueness value of 0.453 as it is shared amongst two fingerprint records. Value 1.A has Fingerprint 1 sharing the same Value 1.A, which in this example is the <IE version 4.0> with Fingerprint 2. As a result Value 1.A is assigned a lower a uniqueness value of 0.452 as this value is being shared amongst two fingerprint records it is not completely a unique value. Similarly, all the other attribute values are assigned uniqueness values. Further, the fingerprint reference list column identifies Fingerprint 1 and Fingerprint 2 to be potential fingerprints associated with the same attribute value <Value 1.A>.

In step 330, the network traffic management apparatus 12 of the network traffic management system 10 updates the attribute volatility database table. The Table 3 is an attribute volatility database table which includes a volatility range associated with each of the attributes and the change history range/histogram associated with the fingerprint attributes. Each of the attributes is associated with a volatility range. The volatility range in one example, may be automatically learned based on previous updates for that attribute associated with other client devices. In other example, the volatility range may be predetermined and stored by a system administrator. In this example, for the Table 3, the Attribute 1 is the browser version number with a volatility range of 2 days. The volatility range indicates that, by way of example, the browser versions would be changed every 2 days and the Change History Range indicates all the dates when the browser updates occurred over a time period. In this example, as the updates are released every 2 days, the change history range would be 2 days apart. Similarly, for Attribute 2 and for Attribute 3 the associated volatility ranges and change history range are included in the table 3.

In step 332, the network traffic management apparatus 12 of the network traffic management system 10 updates the histogram database table based on the fingerprints that have previously been determined to be successfully identified as the correct fingerprint. Based on a successfully match in step 316 of the Fingerprint-1 the network traffic management apparatus 12 updates the list of fingerprints to be successfully identified as the correct fingerprint to include Fingerprint-1. The Fingerprint-1 is stored with a timestamp of when it was successful matched and method proceeds to step 334.

In step 332, the network traffic management apparatus 12 of the network traffic management system 10 sends the client access request to one of the server devices 16(1)-16(n) associated with the received client access request.

Figure 4:
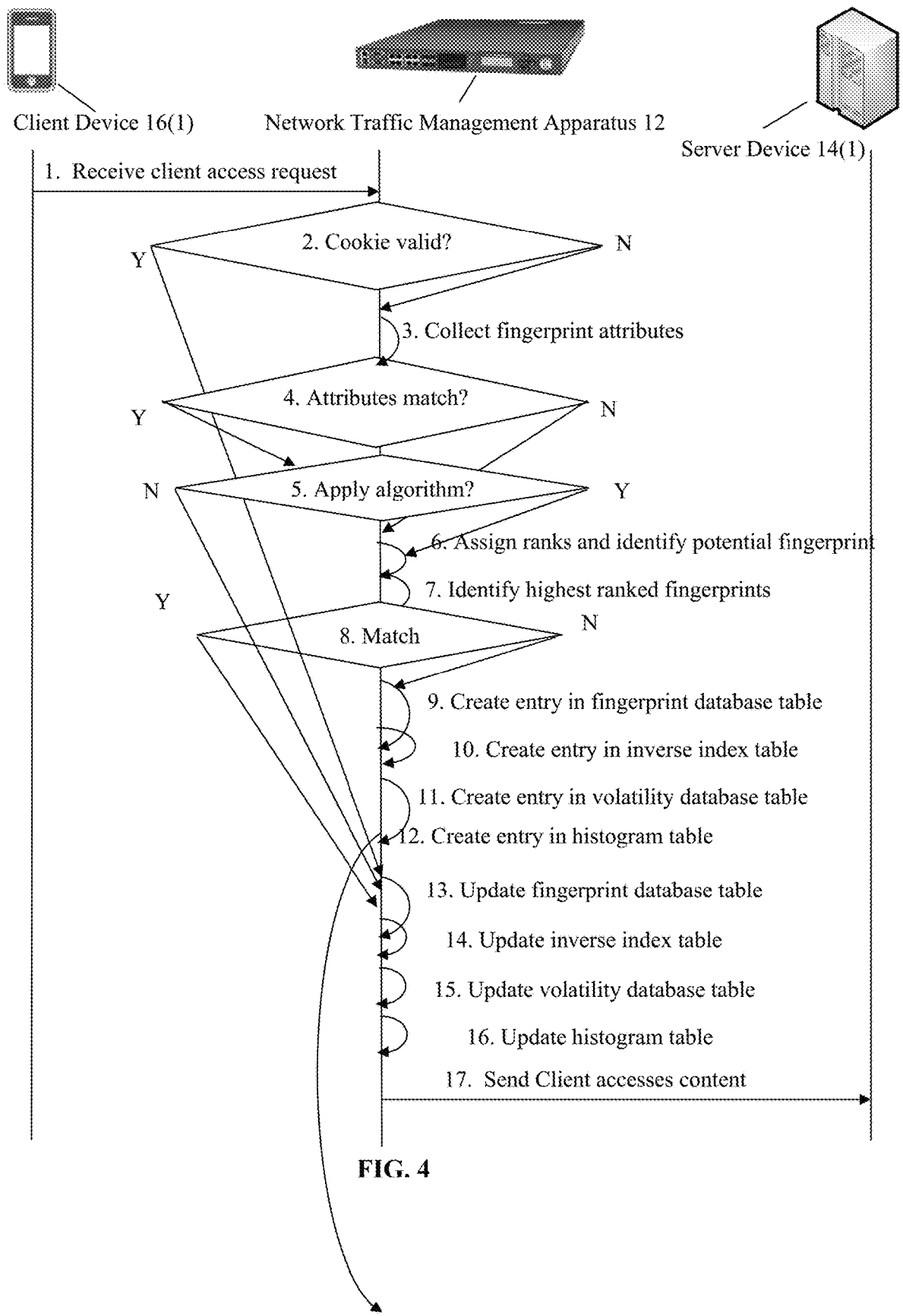
FIG. 4 is a timing diagram of an exemplary method for dynamic fingerprint matching.

Referring more specifically to FIG. 4, in a first step 1 in this example, the network traffic management apparatus 12 of the network traffic management system 10 receives a client access request from a client device 16(1) to access one or more applications at the server device 14(1).

In step 2, the network traffic management apparatus 12 of the network traffic management system 10 determines if the received cookie is valid. The network traffic management apparatus 12 determines if the received cookie is valid based on the timestamp of the cookie, IP address associated with the cookie and the cryptography of the cookie. The network traffic management apparatus 12 determines if the timestamp associated with the cookie has expired in comparison to a predefined time threshold, by way of example, 15 minutes. If the received cookie has a timestamp within 15 minuets the cookie is determined to be a valid cookie. The network traffic management apparatus 12 determines if the IP address associated with the cookie matches with a previously stored list of valid IP addresses then the cookie is determined to be a valid cookie. The network traffic management apparatus 12 determines if the cryptography associated with a key of the cryptography then the cookie is determined to be a valid cookie. If either one of the timestamp of the cookie, IP address associated with the cookie and the cryptography of the cookie fails the validation then the cookie is determined to be invalid and the method proceeds to step 3. When all three of the timestamp of the cookie, IP address associated with the cookie and the cryptography of the cookie are successfully validated then the cookie is determined to be valid and the method proceeds to step 13.

In step 3, the network traffic management apparatus 12 of the network traffic management system 10 the network traffic management apparatus 12 of the network traffic management system 10 collects fingerprint attributes associated with the client device 16(1). The fingerprint attributes may include for example client device type, user profile information associated with the user of the client device 16(1), an application type utilized by the client device 16(1), and/or a web browser type utilized by the client device

16(1), although other types of attributes may be used. In this example, each of the attributes also includes an update history and attribute values, such as Value 1.A, Value 1.B, Value 2.A, Value 2.B, Value 2.C, Value 3.A, Value 3.B, Value 3.0 in this example. By way of example, if the attribute is a web browser, then the attribute value may be a browser version number. The network traffic management apparatus 12 also checks a browser local storage of a browser associated with the client device 16(1) to collect fingerprint attributes and client device identifier (ID) of the requesting client device 16(1) stored in the browser local storage. The collected client device ID is an encrypted identifier which is decrypted by the network traffic management apparatus 12 to determine the client device ID. A client device ID is an identifier assigned to each requesting client device 16(1) by the network traffic management apparatus 12. The client device ID associated with the requesting client device 16(1) is stored as a record or a Fingerprint in the fingerprint data storage stored in the memory. Table 1 of FIG. 5A shows a fingerprint database table that includes, a client device ID for different client devices 16(1), 16 (2) and 16(3) stored as, by way of example, Fingerprint-1, Fingerprint-2 and Fingerprint-3. By way of example, the Fingerprint-1 is associated with a client device-1, the Fingerprint-2 is associated with a client device-2, and the Fingerprint-3 is associated with a client device-3. Further, each fingerprint record, Fingerprint-1, Fingerprint-2 and Fingerprint-3 is a network identifier of the client device 16(1). The network identifier may include an IP address and/or MAC address associated with the requesting client device 16(1). Table 1 shows the attributes collected for Fingerprint-1 may include, fingerprint attribute-1, fingerprint attribute-2, fingerprint attribute-3. The network traffic management apparatus 12 of the network traffic management system 10 collects fingerprint attributes associated with the client device ID. Upon collecting the fingerprint attributes the method proceeds to step 4. By way of example, the fingerprint database Table 1 may include any number of client device ID's and any number of fingerprint attributes.

In step 4, the network traffic management apparatus 12 of the network traffic management system 10 determines if the collected fingerprint attributes from the browser local storage in the browser of client device 16(1) in step 3 match to previously stored fingerprint attributes in the fingerprint database Table 1. The network traffic management apparatus 12 compares the collected fingerprint attributes of step 3 to the fingerprint attributes of stored device fingerprints. In this example, the stored device fingerprints include, Fingerprint 1, Fingerprint 2 and/or Fingerprint 3 of Table 1 that are previously stored fingerprint attributes. Upon a match the network traffic management apparatus 12 creates a list of client device ID that have fingerprint attributes that match with the collected fingerprint attributes. When the network traffic management apparatus 12 determines the collected attributes match with a previously stored fingerprint attributes associated with one of a client device ID then the requesting client device 16(1) is validated as a known device and the method proceeds to step 5. When the network traffic management apparatus 12 determines the collected fingerprint attributes do not match with the previously stored fingerprint attributes associated with one of a client device ID then the method proceeds to step 6. This matching to validate the client device 16(1) also helps in identifying that no other malicious entity has made the request by spoofing the client device network identifier over the network to determine any potential security threats and/or attacks.

In step 5, the network traffic management apparatus 12 of the network traffic management system 10 determines if a learning algorithm is to be applied based on determining that the collected attributes match with a previously stored fingerprint attributes associated with a client device ID. Even though the there is a matching client device ID with the same attributes, the system administrator may still assign policies causing the network traffic management apparatus 12 to proceed to step 6 to apply a learning algorithm to further learn the results of the method. If the network traffic management apparatus 12 of the network traffic management system 10 determines that the system administrator has not assigned policies causing the network traffic management apparatus 12 to apply a learning algorithm then the method proceeds to step 13. If the network traffic management apparatus 12 of the network traffic management system 10 determines that the learning algorithm is to be applied then the method proceeds to step 6.

In step 6, the network traffic management apparatus 12 of the network traffic management system 10 assigns ranks to each of the stored device fingerprints when the comparison fails to identify any stored fingerprint attributes that match with the collected fingerprint attributes in step 4. When the network traffic management apparatus 12 determines in step 4 that none of the stored device fingerprints match with the collected fingerprint attributes, then the network traffic management apparatus 12 assigns ranks to each of the previously stored device fingerprints based on a comparison of fingerprint database table with inverse index table and volatility database table. The network traffic management apparatus 12 performs a comparison between the fingerprint database table, the inverse index table and the attribute volatility table. The network traffic management apparatus 12 compares the update history records for the identified list of potential fingerprints in the inverse index table with the volatility ranges associated with each of the fingerprints to determine one of the fingerprints from the list of potential fingerprints to be the fingerprint associated with the stored device fingerprints. By way of example, the network traffic management apparatus 12 compares the value of <Value 1.A> for Attribute 1 of Fingerprint 1 and Fingerprint 2 with the volatility range and update history of Attribute 1. In this example, when the browser version value is <IE Version 4.0>, then the network traffic management apparatus 12 determines from the attribute volatility table the attribute 1<Value 1.A> has a volatility range of 2 days, and the most recent change history range of Jan. 1, 2016 & Jan. 3, 2016 for Fingerprint 1 and Dec. 10, 2015 & Jan. 2, 2016 for Fingerprint 2. As the volatility range is of 2 days, this indicates that version update of Fingerprint 2 on Dec. 20, 2015 & Jan. 2, 2016 with volatility range of 19 days is incorrect, as it does not meet the volatility range of 2 days associated with the Attribute 1. Accordingly, the network traffic management apparatus 12 determines that the Fingerprint 2 is an unsuccessful match. Further, Fingerprint 1 has volatility date range of 2 days from on Jan. 1, 2016 & Jan. 3, 2016 which meets the volatility date range of 2 days associated with the Attribute 1 and is the correct range and that thus the network traffic management apparatus 12 determines Fingerprint 1 to be a successful match. Thus, the network traffic management apparatus 12 determines that as the Fingerprint 2 is an unsuccessful match and Fingerprint 1 is a successful match. These comparison results for a successful match or an unsuccessful match is utilized to assign ranks to each of the fingerprints.

The network traffic management apparatus 12 of the network traffic management system 10 assigns ranks to each of the stored device fingerprints based on the comparison. When, Fingerprint 1 is a successful match and Fingerprint 2 is an unsuccessful match, thus the network traffic management apparatus 12 assigns Fingerprint 2 a lower potential fingerprint rank of 2 in comparison to Fingerprint 1, which is assigned a higher potential fingerprint rank of 1 for equal values of <Value 1.A>. The network traffic management apparatus 12 determines for Fingerprint-1 the value for <Value 1.A> is 0.453 and for Fingerprint-2 the value of <Value 1.A> is also 0.453. Further, the network traffic management apparatus 12 determines Fingerprint-1 to have rank of 1 as all three attribute values <Value 1.A=0.453>, <Value 2.A=0.87> and <Value 3.A=0.851> to have the highest uniqueness values in comparison to the attribute uniqueness values associated with Fingerprint-2 which is <Value 1.A=0.453>, <Value 2.B=0.53>, <Value 3.B=0.40> and the Fingeprint-2 is assigned a rank 2 and further in comparison to Fingerprint-3 which is <Value 3.A=0.251>, <Value 3.B=0.40>, <Value 3.C=0.30> and Fingerprint-3 is assigned a rank 3. In another example, the network traffic management In step 7, the network traffic management apparatus 12 of the network traffic management system 10 identifies the highest ranked fingerprint. In this example, based on the ranks assigned in step 6, the network traffic management apparatus 12 identifies Fingerprint-1 to be assigned the highest rank 1 and the method proceeds to step 8. In another example, the network traffic management apparatus 12 of the network traffic management system 10 identifies the highest ranked fingerprint to be both of the fingerprints Fingerprint 1 and Fingerprint 2 and the method proceeds to step 8.

In step 8, the network traffic management apparatus 12 of the network traffic management system 10 determines if the highest ranked fingerprint matches with one of a previously learned fingerprint in a histogram database. The histogram data storage stores a histogram table that includes a list of fingerprints that have been previously determined to be successfully identified as the correct fingerprint based on earlier potential fingerprint rankings. The network traffic management apparatus 12, in this example, determines if the Fingerprint-1 matches with one of the fingerprints from the list of stored fingerprints in the histogram data storage. When the network traffic management apparatus 12 determines that the attribute values of Fingerprint-1 does not match with the attribute values of any of the fingerprints from the list of stored fingerprints then the method takes the No branch to step 9. In another example, the network traffic management apparatus 12 determines if both of the highest ranked fingerprints, Fingerprint 1 and Fingerprint 2 matches with one of the fingerprints from the list of stored fingerprints in the histogram data storage. When the network traffic management apparatus 12 determines that the attribute values of both of the highest ranked fingerprints, Fingerprint 1 and Fingerprint 2 do not match with the attribute values of any of the fingerprints from the list of stored fingerprints then the method takes the No branch to step 9.

In step 9, the network traffic management apparatus 12 of the network traffic management system 10 creates an entry in a fingerprint database table with the collected fingerprint attributes. The network traffic management apparatus 12 updates the Table-1 for each of the fingerprint records, by way of example, Fingerprint-1, Fingerprint-2 and Fingerprint-3. Each of the fingerprint record is updated with its corresponding fingerprint attributes-1, fingerprint attribute-2 and fingerprint attribute-3.

In step 10, the network traffic management apparatus 12 of the network traffic management system 10 creates an entry in the Table-2 inverse index table based on the attribute values stored in the fingerprint database table. The network traffic management apparatus 12 determines a uniqueness value associated with each of the attributes values based on the attribute values stored in the fingerprint database table. Further, the network traffic management apparatus 12 determines a list of potential fingerprints. Table 2 shows uniqueness values assigned to each of the attribute values based on their uniqueness. As shown in the Table 2, the attribute 2 with Value 2.A of Fingerprint 1 is assigned a uniqueness value of 0.87. Here, Value 2.A which in this example, is <Windows OS 2000> is not being shared with any other Fingerprint records it is given a higher uniqueness value in comparison to Value 1.A which is assigned a uniqueness value of 0.453 as it is shared amongst two fingerprint records. Value 1.A has Fingerprint 1 sharing the same Value 1.A, which in this example is the <IE version 4.0> with Fingerprint 2. As a result Value 1.A is assigned a lower a uniqueness value of 0.452 as this value is being shared amongst two fingerprint records it is not completely a unique value. Similarly, all the other attribute values are assigned uniqueness values. Further, the fingerprint reference list column identifies Fingerprint 1 and Fingerprint 2 to be potential fingerprints associated with the same attribute value <Value 1.A>.

TABLE 2

Illustration of the inverse index table

| Attribute Value | Uniqueness Value | Fingerprint Reference List |
|---|---|---|
| Value 1.A | 0.453 | Fingerprint 1, Fingerprint 2... |
| Value 1.B | 0.30 | Fingerprint 3... |
| Value 2.A | 0.87 | Fingerprint 1... |
| Value 2.B | 0.53 | Fingerprint 2... |
| Value 2.C | 0.20 | Fingerprint 3... |
| Value 3.A | 0.251 | Fingerprint 1... |
| Value 3.B | 0.40 | Fingerprint 2... |
| Value 3.C | 0.30 | Fingerprint 3... |

In step 11, the network traffic management apparatus 12 of the network traffic management system 10 creates an entry in the attribute volatility database table. The Table 3 is an attribute volatility database table which includes a volatility range associated with each of the attributes and the change history range/histogram associated with the fingerprint attributes. Each of the attributes is associated with a volatility range. The volatility range in one example, may be automatically learned based on previous updates for that attribute associated with other client devices. In other example, the volatility range may be predetermined and stored by a system administrator. In this example, for the Table 3, the Attribute 1 is the browser version number with a volatility range of 2 days. The volatility range indicates that, by way of example, the browser versions would be changed every 2 days and the Change History Range indicates all the dates when the browser updates occurred over a time period. In this example, as the updates are released every 2 days, the change history range would be 2 days apart. Similarly, for Attribute 2 and for Attribute 3 the associated volatility ranges and change history range are included in the Table 3.

TABLE 3

| Attribute volatility table | | |
|---|---|---|
| Attributes | Volatility Range | Change History Range |
| Attribute 1 | 2 days | <Date>, <Date>, <Date>, . . . |
| Attribute 2 | 15 days | <Date>, <Date>, <Date>, . . . |
| Attribute 3 | 3 hours | <Date>, <Date>, <Date>, . . . |

In step 12, the network traffic management apparatus 12 of the network traffic management system 10 creates an entry in the histogram database table based on the fingerprints that have previously been determined to be successfully identified as the correct fingerprint. Based on a successfully match in step 8 of the Fingerprint-1 the network traffic management apparatus 12 updates the list of fingerprints to be successfully identified as the correct fingerprint to include Fingerprint-1. The Fingerprint-1 is stored with a timestamp of when it was successful matched and method proceeds to step 17.

If back in step 8, the attribute values of Fingerprint-1 are determined to match with the attribute values of another fingerprint from the list of stored fingerprints then the method takes the Yes branch to step 13. In another example, from both of the highest ranked fingerprints Fingeprint-1 and Fingeprint-2, if back in step 8 the attribute values of Fingerprint-1 are determined to match with the attribute values of another fingerprint from the list of stored fingerprints then the method takes the Yes branch to step 13.

In step 13, the network traffic management apparatus 12 of the network traffic management system 10 updates the fingerprint database table with the collected fingerprint attributes. Further, the method may reach the step 13 from steps 2 and 5. The network traffic management apparatus 10 updates the Table-1 for each of the fingerprint records, by way of example, Fingerprint-1, Fingerprint-2 and Fingerprint-3. Each of the fingerprint record is updated with its corresponding fingerprint attributes-1, fingerprint attribute-2 and fingerprint attribute-3.

In step 14, the network traffic management apparatus 12 of the network traffic management system 10 updates the Table-2 inverse index table based on the attribute values stored in the fingerprint database table. The network traffic management apparatus 12 determines a uniqueness value associated with each of the attributes values based on the attribute values stored in the fingerprint database table. Further, the network traffic management apparatus 12 determines a list of potential fingerprints. Table 2 shows uniqueness values assigned to each of the attribute values based on their uniqueness. As shown in the Table 2, the attribute 2 with Value 2.A of Fingerprint 1 is assigned a uniqueness value of 0.87. Here, Value 2.A which in this example, is <Windows OS 2000> is not being shared with any other Fingerprint records it is given a higher uniqueness value in comparison to Value 1.A which is assigned a uniqueness value of 0.453 as it is shared amongst two fingerprint records. Value 1.A has Fingerprint 1 sharing the same Value 1.A, which in this example is the <IE version 4.0> with Fingerprint 2. As a result Value 1.A is assigned a lower a uniqueness value of 0.452 as this value is being shared amongst two fingerprint records it is not completely a unique value. Similarly, all the other attribute values are assigned uniqueness values. Further, the fingerprint reference list column identifies Fingerprint 1 and Fingerprint 2 to be potential fingerprints associated with the same attribute value <Value 1.A>.

In step 15, the network traffic management apparatus 12 of the network traffic management system 10 updates the attribute volatility database table. The table-3 is an attribute volatility database table which includes a volatility range associated with each of the attributes and the change history range/histogram associated with the fingerprint attributes. Each of the attributes is associated with a volatility range. The volatility range in one example, may be automatically learned based on previous updates for that attribute associated with other client devices. In other example, the volatility range may be predetermined and stored by a system administrator. In this example, for the Table 3, the Attribute 1 is the browser version number with a volatility range of 2 days. The volatility range indicates that, by way of example, the browser versions would be changed every 2 days and the Change History Range indicates all the dates when the browser updates occurred over a time period. In this example, as the updates are released every 2 days, the change history range would be 2 days apart. Similarly, for Attribute 2 and for Attribute 3 the associated volatility ranges and change history range are included in the table 3.

In step 16, the network traffic management apparatus 12 of the network traffic management system 10 updates the histogram database table based on the fingerprints that have previously been determined to be successfully identified as the correct fingerprint. Based on a successfully match in step 8 of the Fingerprint-1 the network traffic management apparatus 12 updates the list of fingerprints to be successfully identified as the correct fingerprint to include Fingerprint-1. The Fingerprint-1 is stored with a timestamp of when it was successful matched and method proceeds to step 17.

In step 17, the network traffic management apparatus 12 of the network traffic management system 10 sends the client access request to an associated server device 14(1).

Accordingly this technology provides an automated system of identifying invalid fingerprints and only authorizing access to valid fingerprints and thus detecting bots and malicious attacks over a network. Advantageously, this technology provides a dynamic learning and scoring of valid fingerprints over a period of time. Thus providing the advantages of utilizing the valid fingerprints to further filter fingerprints that are similar to each other and difficult to differentiate dynamically.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for dynamic fingerprint matching implemented in cooperation with a network traffic management system comprising one or more network traffic management modules, server modules, or client modules, the method comprising:

receiving a client access request to access content at one or more server devices from a client device;

collecting one or more fingerprint attributes associated with the client device and determining a uniqueness value and a volatility range associated with each of the collected one or more fingerprint attributes;

identifying one or more potential fingerprints based on the collected one or more fingerprint attributes;

determining when one of the potential fingerprints matches with one of a plurality of previously validated fingerprints stored in a database; and authorizing the client device to access content requested in the client access request and updating a list of the previously validated fingerprints stored in the database, when the determination indicates that the one of the potential fingerprints matches with one of the previously validated fingerprints stored in the database.

2. The method of claim 1, further comprising:

assigning a rank to each of the one or more potential fingerprints based on the fingerprint attribute values, the uniqueness values and the volatility range.

3. The method of claim 2, further comprising:

denying authorization to the client device to access content requested in the client access request when the determination indicates that none of the potential fingerprints match with any of the previously validated fingerprints stored in the database.

4. A network traffic management apparatus, comprising memory comprising programmed instructions stored thereon and one or more processors configured to be capable of executing the stored programmed instructions to:

receive a client access request to access content at one or more server devices from a client device;

collect one or more fingerprint attributes associated with the client device and determine a uniqueness value and a volatility range associated with each of the collected one or more fingerprint attributes;

identify one or more potential fingerprints based on the collected one or more fingerprint attributes;

determine when one of the potential fingerprints matches with one of a plurality of previously validated fingerprints stored in a database; and authorize the client device to access content requested in the client access request and update a list of the previously validated fingerprints stored in the database, when the determination indicates that the one of the potential fingerprints matches with one of the previously validated fingerprints stored in the database.

5. The network traffic management apparatus of claim 4, wherein the one or more processors are further configured to be capable of executing the stored programmed instructions to:

assign a rank to each of the one or more potential fingerprints based on the fingerprint attribute values, the uniqueness values and the volatility range.

6. The network traffic management apparatus of claim 4, wherein the one or more processors are further configured to be capable of executing the stored programmed instructions to:

deny authorization to the client device to access content requested in the client access request when the determination indicates that none of the potential fingerprints match with any of the previously validated fingerprints stored in the database.

7. A non-transitory computer readable medium having stored thereon instructions for dynamic fingerprint matching comprising executable code which when executed by one or more processors, causes the one or more processors to:

receive a client access request to access content at one or more server devices from a client device;

collect one or more fingerprint attributes associated with the client device and determine a uniqueness value and a volatility range associated with each of the collected one or more fingerprint attributes;

identify one or more potential fingerprints based on the collected one or more fingerprint attributes;

determine when one of the potential fingerprints matches with one of a plurality of previously validated fingerprints stored in a database; and authorize the client device to access content requested in the client access request and update a list of the previously validated fingerprints stored in the database, when the determination indicates that the one of the potential fingerprints matches with one of the previously validated fingerprints stored in the database.

8. The non-transitory computer readable medium of claim 7, wherein the executable code when executed by the one or more processors further causes the one or more processors to:

assign a rank to each of the one or more potential fingerprints based on the fingerprint attribute values, the uniqueness values and the volatility range.

9. The non-transitory computer readable medium of claim 7, wherein the executable code when executed by the one or more processors further causes the one or more processors to:

deny authorization to the client device to access content requested in the client access request when the determination indicates that none of the potential fingerprints match with any of the previously validated fingerprints stored in the database.

10. A network traffic management system, comprising one or more network traffic management modules, client modules, or server modules, the memory comprising programmed instructions stored thereon and one or more processors configured to be capable of executing the stored programmed instructions to:

receive a client access request to access content at one or more server devices from a client device;

collect one or more fingerprint attributes associated with the client device and determine a uniqueness value and a volatility range associated with each of the collected one or more fingerprint attributes;

identify one or more potential fingerprints based on the collected one or more fingerprint attributes;

determine when one of the potential fingerprints matches with one of a plurality of previously validated fingerprints stored in a database; and authorize the client device to access content requested in the client access request and update a list of the previously validated fingerprints stored in the database, when the determination indicates that the one of the potential fingerprints matches with one of the previously validated fingerprints stored in the database.

11. The network traffic management system of claim 10, wherein the one or more processors are further configured to be capable of executing the stored programmed instructions to:

assign a rank to each of the one or more potential fingerprints based on the fingerprint attribute values, the uniqueness values and the volatility range.

12. The network traffic management system of claim 10, wherein the one or more processors are further configured to be capable of executing the stored programmed instructions to:

deny authorization to the client device to access content requested in the client access request when the determination indicates that none of the potential fingerprints match with any of the previously validated fingerprints stored in the database.

13. The method as set forth in claim 1 wherein the one or more fingerprint attributes further comprises a type of the client device, a user profile data associated with the client device, a type of an application executing on the client device, or a type of web browser associated with the client device.

14. The method as set forth in claim 1 further comprising, applying a learning algorithm when the one of the potential fingerprints matches with one of the plurality of previously validated fingerprints stored in the database.

15. The device as set forth in claim 4 wherein the one or more fingerprint attributes further comprises a type of the client device, a user profile data associated with the client device, a type of an application executing on the client device, or a type of web browser associated with the client device.

16. The device as set forth in claim 4 wherein the one or more processors are further configured to be capable of executing the stored programmed instructions to apply a learning algorithm when the one of the potential fingerprints matches with one of the plurality of previously validated fingerprints stored in the database.

17. The medium as set forth in claim 7, wherein the one or more fingerprint attributes further comprises a type of the client device, a user profile data associated with the client device, a type of an application executing on the client device, or a type of web browser associated with the client device.

18. The medium as set forth in claim 7 further comprising, applying a learning algorithm when the one of the potential fingerprints matches with one of the plurality of previously validated fingerprints stored in the database.

19. The network traffic management system of claim 10, wherein the one or more fingerprint attributes further comprises a type of the client device, a user profile data associated with the client device, a type of an application executing on the client device, or a type of web browser associated with the client device.

20. The network traffic management system of claim 10, wherein the one or more processors are further configured to be capable of executing the stored programmed instructions to apply a learning algorithm when the one of the potential fingerprints matches with one of the plurality of previously validated fingerprints stored in the database.

* * * * *